(12) United States Patent
Yoo et al.

(10) Patent No.: US 8,313,881 B2
(45) Date of Patent: Nov. 20, 2012

(54) POLYESTER RESIN AND TONER INCLUDING THE SAME

(75) Inventors: Young-Man Yoo, Gyeonggi-do (KR); Jae-Kyoung Roh, Gyeonggi-do (KR); Kye-Yune Lee, Gyeonggi-do (KR); Tae-Woong Lee, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 244 days.

(21) Appl. No.: 12/743,799

(22) PCT Filed: Jul. 10, 2008

(86) PCT No.: PCT/KR2008/004067
§ 371 (c)(1),
(2), (4) Date: May 19, 2010

(87) PCT Pub. No.: WO2009/066849
PCT Pub. Date: May 28, 2009

(65) Prior Publication Data
US 2010/0239970 A1      Sep. 23, 2010

(30) Foreign Application Priority Data

Nov. 21, 2007  (KR) .................. 10-2007-0119212

(51) Int. Cl.
*G03G 9/087* (2006.01)
*C08G 63/12* (2006.01)

(52) U.S. Cl. ............ 430/109.4; 430/108.2; 430/137.15; 524/710; 528/279; 528/286; 528/296

(58) Field of Classification Search ............... 430/108.2, 430/109.4, 137.15; 528/286, 279, 296; 524/710
See application file for complete search history.

(56) References Cited

U.S. PATENT DOCUMENTS

| | | | |
|---|---|---|---|
| 6,924,349 B2 * | 8/2005 | Lee et al. | 528/272 |
| 7,078,476 B2 * | 7/2006 | Woong et al. | 528/272 |

FOREIGN PATENT DOCUMENTS

| | | |
|---|---|---|
| JP | 11-305484 A | 11/1999 |
| JP | H11-305485 | 11/1999 |
| JP | 2004-126544 | 4/2004 |
| JP | 2006-106727 | 4/2006 |
| KR | 10-2005-0051543 | 6/2005 |
| KR | 10-2006-0018129 | 2/2006 |
| KR | 10-0666408 | 1/2007 |

OTHER PUBLICATIONS

Japanese Patent Office machine-assisted translation of Jp 11-305484 (pub. Nov. 1999).*

* cited by examiner

*Primary Examiner* — Janis L Dote
(74) *Attorney, Agent, or Firm* — Blakely, Sokoloff, Taylor & Zafman

(57) ABSTRACT

A toner for an electrophotographic image forming process or an electrostatic printing process, and a polyester resin for the toner are disclosed. The polyester resin comprises: acid components including 70 to 96 mol % of aromatic dibasic acid component, 3 to 20 mol % of cycloaliphatic dibasic acid component, and 1 to 10 mol % of trivalent or higher acid component; alcohol components including 10 to 50 mol % of cycloaliphatic diol component, 2 to 20 mol % of trihydric or higher alcohol component, and 30 to 88 mol % of aliphatic diol component; and a heat stabilizer.

6 Claims, No Drawings

POLYESTER RESIN AND TONER INCLUDING THE SAME

This is a non-provisional application claiming the benefit of International application number PCT/KR2008/004067 filed Jul. 10, 2008.

TECHNICAL FIELD

This application claims the priority benefit of Korean Patent Application No. 10-2007-119212 filed on Nov. 21, 2007, the entire contents of which are incorporated herein by reference. This invention relates to a polyester resin and a toner including the same, and more particularly, to a toner for an electrophotographic image forming process or an electrostatic printing process, and a polyester resin, which is included in the toner as a binder.

BACKGROUND ART

Generally, an electrophotographic image forming process or an electrostatic printing process includes the steps of (1) forming an electro-conductive image (i.e., a latent image) or an electrostatically charged image corresponding to a recorded image on the surface of an electrostatic recording medium, for example, an OPC (Organic Photo-conductor) drum, (2) developing the latent image with a charged toner, (3) transferring the developed toner image onto a recording material, such as a paper or a recordable film, and (4) fixing the transferred image on the recording material with a heat-compressing roller. The image-forming process such as the electrophotographic image forming process or the electrostatic printing process has advantages in that a printed or copied matter can be obtained with a high speed, the image formed on a recording material is stable, and an image-forming device is easy to manipulate. Therefore, the image-forming process has been widely used in the fields of copiers and printers.

The toner for the developing process can be classified into a one-component toner, a two-component toner, etc. The two-component toner includes a binder resin, a coloring agent, an electrification control agent, various additives, and magnetic substances for developing the latent image formed on a drum and transferring the developed image. In general, the toner is produced in the form of particles by melting, kneading, and dispersing the toner components, and then finely pulverizing and classifying the kneaded components. The binder resin, which is one of the main components of the toner composition, should have desirable properties in dispersing the coloring agent, and in a fixing property, an offset-preventing property, a storage-stability, and an electrical property. The binder resin also should have a good transparency, and produce a clear image even when a small amount of the coloring agent is used. Further preferably, the binder resin should have a wide color expression range, improve the image density of a copied or printed image, and be environmentally desirable.

As the binder resin, polystyrene resin, styrene-acrylic resin, epoxy resin, and polyamide resin have been conventionally used. Recently, a polyester resin is more commonly used as the binder resin due to its superior fixing property, good transparency, and so on. The polyester resin for the binder resin generally uses bisphenol A or its derivatives as the alcohol component of the polyester resin. However, bisphenol A is not desirable in an environmental aspect. Therefore, various researches have been carried out to produce a polyester resin having desirable offset-preventing property, low-temperature fixing property, sharp-melting property, blocking-preventing property, electrical charging property, pulverizing property, storage stability, transparency, image-forming property, and so on without using bisphenol A or its derivatives. For example, in Korean Patent Laid Open Nos. 10-2005-51543 and 10-2005-6232, resins without including bisphenol A or its derivatives are disclosed. However, the resins include relatively large amount of ester groups, which are polar groups, so the resins absorb much water at high temperature and high moisture condition. Therefore, in the cartridge of high temperature and high humidity condition, the initial print image would be good, but the print image would become deteriorated as the printing proceeds since the toner absorbs much water and the electrical charging property of the toner becomes deteriorated. In the above-mentioned patents, in order to improve the offset-preventing property of a toner, the resin was cross-linked or gelated (i.e., increase of insoluble content of resin in tetrahydrofuran (THF)) by using polyvalent acid component and/or polyhydric alcohol component. However, the cross-linked or gelated part of the polyester resin is easily degraded due to a high shear stress when extruded and kneaded for the production of a toner, which deteriorates the offset-preventing property of the toner. The drawbacks of the polyester resin without bisphenol A or its derivatives have not been solved yet. In Japanese Patent Laid Open (kokai) No. H11-305485, cyclohexane dibasic acid or diol is introduced in the production of a polyester resin in order to improve the fixing property and the color tone reproduction of a toner. In the patent, cyclohexane dicarboxylic acid is used in the amount of more than 20 mol %, and thus, the produced polyester resin has the glass transition temperature (Tg) of less than about 58° C., which deteriorates the storage stability and the pulverizing property of a toner. Also, in the patent, the deterioration of the fixing property of a toner due to the amount of the cyclohexane dibasic acid or diol in the resin was not considered.

In preparing a polyester resin for toner, a catalyst such as germanium based catalyst, antimony based catalyst, and tin based catalyst and so on has been used. However, because the catalyst should be used in large amount due to a low catalytic activity of the catalyst, the catalyst is not desirable in an environmental aspect. The conventional catalyst deteriorates the transparency of a polyester resin due to its characteristic coloring property (for example, the antimony based catalyst has a gray coloring property). Therefore, titanium based catalyst is tried to improve the catalytic activity and the transparency of a polyester resin, and the titanium based catalyst includes tetraethyl titanate, acetyltripropyl titanate, tetrapropyl titanate, tetrabutyl titanate, polybutyl titanate, ethylacetoaceticester titanate, isostearyl titanate, titanium dioxide, $TiO_2/SiO_2$ co-precipitates, $TiO_2/ZrO_2$ co-precipitates, and so on.

DISCLOSURE OF INVENTION

Technical Problem

Therefore, it is an object of the present invention to provide a polyester resin for toner, which does not include bisphenol A or its derivatives as an alcohol component, and does not require a heavy metal catalyst such as antimony, tin, and so on in a polymerization process, and accordingly, is environmentally desirable.

It is another object of the present invention to provide a toner, which can be economically produced, and has desirable characteristics in offset-preventing property, storage stability, fixing property on an electrostatic recording material, image density, durability and moisture-proof property, and accordingly, has desirable image stability.

Technical Solution

In order to achieve these objects, the present invention provides a polyester resin comprising acid components including 70 to 96 mol % of aromatic dibasic acid component, 3 to 20 mol % of cycloaliphatic dibasic acid component, and 1 to 10 mol % of trivalent or higher acid component; alcohol components including 10 to 50 mol % of cycloaliphatic diol component, 2 to 20 mol % of trihydric or higher alcohol component, and 30 to 88 mol % of aliphatic diol component; and a heat-stabilizer.

Advantageous Effects

As described above, the polyester resin according to the present invention comprises aromatic dibasic acid, dimethyl 1,4-cyclohexane dicarboxylate (or 1,4-cyclohexane dicarboxylic acid), trivalent or higher acid, 1,4-cyclohexane dimethanol, trihydric or higher alcohol, aliphatic diol, and a heat stabilizer, and does not require bisphenol-A or its derivatives as the alcohol component and does not require heavy metal catalyst such as tin, antimony, and so on, and accordingly, is environmentally desirable. The toner prepared with the polyester resin according to the present invention can be economically prepared, and has a desirable storage stability, a desirable fixing temperature range, a desirable image density, and so on.

MODE FOR THE INVENTION

A more complete appreciation of the invention, and many of the attendant advantages thereof, will be better appreciated by reference to the following detailed description.

A polyester resin according to the present invention comprises acid components and alcohol components. The acid components include aromatic dibasic acid component, cycloaliphatic dibasic acid component, and trivalent or higher acid component. The aromatic dibasic acid component comprises aromatic dibasic acid, alkyl(for example, methyl, ethyl, propyl, and so on) ester thereof and acid anhydride thereof, which are conventionally used in preparation of a polyester resin. Examples of the aromatic dibasic acid include terephthalic acid, isophthalic acid, 5-sulfoisophthalic acid sodium salt, phthalic acid, and so on. Examples of the alkyl ester of the aromatic dibasic acid include dimethyl terephthalate, dimethyl isophthalate, diethyl terephthalate, diethyl isophthalate, dibutyl terephthalate, dibutyl isophthalate, dimethyl 5-sulfoisophthalate sodium salt, and so on. The aromatic dibasic acid and alkyl ester thereof may be used independently or in combination. The aromatic dibasic acid has a benzene ring having hydrophobic property, and thereby can improve moisture-proof property of a toner and increase a glass transition temperature (hereinafter, Tg) of the produced resin, which results in an improved storage stability of the toner. The amount of the aromatic dibasic acid component is 70 to 96 mol % with respect to the total acid component (i.e., the amount of the aromatic dibasic acid component is 70 to 96 mol in 100 mol of the total acid components), preferably 70 to 94 mol %, and more preferably 80 to 90 mol %. The terephthalic acid component improves toughness of the resin and increases a Tg of the resin. And the isophthalic acid component increases a reactivity. Accordingly, the ratio of terephthalic acid with respect to isophthalic acid can be controlled according to desired properties of the polyester resin.

In cycloaliphatic dibasic acid component used in the present invention, the cycloaliphatic group has preferably 5 to 20 carbon atoms. Examples of the cycloaliphatic dibasic acid component include 1,2-cyclohexane dicarboxylic acid, 1,3-cyclohexane dicarboxylic acid, 1,4-cyclohexane dicarboxylic acid, alkyl(for example, methyl, ethyl, propyl, and so on) ester thereof, and acid anhydride thereof, which may be used independently or in combination. Also, one or more hydrogen of the cyclic ring of cycloaliphatic group can be substituted with an alkyl group etc. The cycloaliphatic dibasic acid component decreases a storage modulus (one of visco-elasticity properties) of a polyester resin at the low temperature of below 140° C., and accordingly a toner has good low temperature fixing property. Also, since the cycloaliphatic dibasic acid component has a lipophilic property, the toner has a good moisture-proof property, and accordingly, has a good image density. Also, the cyclic ring structure of the cycloaliphatic group improves an anti-hydrolysis property and a heat stability of the resin, and accordingly prevents the decrease of a molecular weight when preparing a toner. Thus, the toner has a good fixing property at wide temperature range. The amount of the cycloaliphatic dibasic acid component is 3 to 20 mol % with respect to the total acid component, and preferably 5 to 10 mol %. When the amount of cycloaliphatic dibasic acid component is less than 3 mol %, the toner may not have a good image density and a good fixing property at wide temperature range, and when the amount of cycloaliphatic dibasic acid component is more than 20 mol %, a Tg of the polyester resin decreases to below about 58° C., and accordingly a storage stability of the toner becomes deteriorated.

Examples of the trivalent or higher acid component include polycarboxylic acids, such as trimellitic acid, pyromellitic acid, 1,2,4-cyclohexane tricarboxylic acid, 2,5,7-naphthalene tricarboxylic acid, 1,2,4-naphthalene tricarboxylic acid, 1,2,5-hexane tricarboxylic acid, 1,2,7,8-octane tetracarboxylic acid, alkyl ester thereof, and acid anhydride thereof. The trivalent or higher carboxylic acid component may be used independently or in combination. The trivalent or higher carboxylic acid component increases a Tg of the produced resin and enhances cohesion property of the resin, and accordingly the toner has an improved offset preventing property. Also, the trivalent or higher carboxylic acid component controls an acid value of the resin and improves an electrical charging property of the toner, so that the toner provides a good image density. The amount of polyvalent acid is 1 to 10 mol %, and preferably 1 to 5 mol % with respect to the total acid components. When the amount of the polyvalent acid is less than 1 mol %, the molecular weight distribution of the polyester resin is narrow, and accordingly, a fixing temperature range of the toner becomes narrow. When the amount of the polyvalent acid is more than 10 mol %, it is difficult to control the gelation of the polyester resin when preparing the resin, and accordingly, it is difficult to obtain the polyester resin having desired properties.

If necessary, the acid components for the polyester resin according to the present invention further include aliphatic dibasic acid, alkyl ester thereof and/or acid anhydride thereof. The aliphatic dibasic acid has a linear or branched structure, and examples of the aliphatic dibasic acid component include phthalic acid, sebacic acid, isodecyl succinic acid, maleic acid, fumaric acid, adipic acid, azelaic acid, and so on, and alkyl ester thereof such as monomethyl ester thereof, monoethyl ester thereof, and dimethyl or diethyl ester thereof, and acid anhydride thereof. The aliphatic dibasic acid component controls a fixing property and a storage stability of a toner, and accordingly, should be appropriately used according to the desired properties of the resin without deteriorating the advantageous effects of the present invention, and for example, the preferable amount of aliphatic dibasic acid component is 0.1 to 10 mol % with respect to the total acid components.

The alcohol components for the polyester resin according to the present invention include cycloaliphatic diol component, trihydric or higher alcohol component, and aliphatic diol component. The cycloaliphatic diol component has preferably 5 to 20 carbon atoms in the cycloaliphatic group thereof. Examples of the cycloaliphatic diol component include 1,4-cyclohexane diol, 1,4-cyclohexane dimethanol, spirogylcol, hydrogenated bisphenol A, ethyleneoxide additive of hydrogenated bisphenol A, propyleneoxide additive of hydrogenated bisphenol A, and so on. The cycloaliphatic diol component increases a storage modulus (one of visco-elasticity properties) of the polyester resin at high temperature of more than 170° C., and accordingly the toner has a high temperature offset property. Also, since the cycloaliphatic diol component has lipophilic property, the toner has a good moisture-proof property, and accordingly, has a good image density. Also, the cyclic ring structure of the cycloaliphatic group improves an anti-hydrolysis property and a heat stability of the polyester resin, and accordingly prevents the decrease of the molecular weight thereof when preparing a toner. Thus, the toner has a good fixing property at wide temperature range. The amount of the cycloaliphatic diol component is 10 to 50 mol %, and preferably 20 to 40 mol % with respect of the total alcohol components. When the amount of the cycloaliphatic diol component is less than 10 mol %, the polyester resin and the toner may include much and unnecessary moisture, and the visco-elasticity property of the toner becomes deteriorated, and a high temperature offset property of the toner cannot be obtained. When the amount of the cycloaliphatic diol component is more than 50 mol %, much time would be necessary for the polymerization of the polyester resin, and it is difficult to obtain the polyester resin having desired properties.

The alcohol components for the polyester resin according to the present invention further includes trihydric or higher alcohol component. Examples of the trihydric or higher alcohol include sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and so on. The trihydric or higher alcohol may be used independently or in combination. The trihydric or higher alcohol component increases a Tg of the resin, and enhances cohesion property of the resin, and accordingly, a toner has an improved storage stability. The amount of the trihydric or higher alcohol is 2 to 20 mol %, and preferably 5 to 15 mol % with respect to the alcohol components. When the amount of the trihydric or higher alcohol is less than 2 mol %, the molecular weight distribution of the resin is narrow, and accordingly the fixing temperature ranges of the toner becomes narrow. When the amount of the trihydric or higher alcohol is more than 20 mol %, it is difficult to control the gelation of the polyester resin when preparing the resin, and accordingly, it is difficult to obtain the polyester resin having desired properties.

The alcohol components for the polyester resin according to the present invention further includes aliphatic diol component. The aliphatic diol component has a linear or branch structure. Examples of aliphatic diol component include 1,2-propanediol (1,2-propylene glycol), ethylene glycol, diethylene glycol, neopentyl glycol, propylene glycol, 1,4-butane diol, and so on. The amount of the aliphatic diol component is preferably 30 to 88 mol % with respect to the total alcohol components.

In the present invention, the alcohol components do not include an aromatic diol which is undesirable in an environmental aspect. Examples of the undesirable aromatic diol include bisphenol A derivative, more specifically, polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, and so on.

The polyester resin according to the present invention further includes a heat stabilizer, more specifically, a polymerization stabilizer, as an additive. Examples of the heat stabilizer include phosphoric acid, trimethyl phosphate, triethyl phosphate, mixtures thereof, and so on, and conventional various heat stabilizers can be used in the present invention. The preferable amount of the heat stabilizer is 5 to 1000 ppm, more preferably 10 to 300 ppm with respect to the total weight of the resin. When the amount of the heat stabilizer is less 5 ppm, the polyester resin can be excessively cross-linked and the gelated part of the polyester resin can be decomposed during the extruding and kneading process for producing a toner, and accordingly, an offset-preventing property of the toner becomes deteriorated. When the amount of the heat-stabilizer is more 1000 ppm, it is difficult to obtain the desirable high polymerization degree.

The polyester resin according to the present invention can be prepared by the conventional two step process of an esterification or ester exchange reaction and a poly-condensation reaction. To produce the polyester resin of the present invention, firstly, the acid components, the alcohol components, and the heat stabilizer may be charged in a reactor and heated to perform the esterification or ester exchange reaction, and then the polycondensation reaction is carried out. Preferably, the esterification (or ester exchange) reaction and/or the poly-condensation reaction can be carried out in the presence of the heat stabilizer. It is preferable that the mole ratio of the total alcohol components (G) with respect to the total acid components (A) is 1.1 to 1.8. When the mole ratio (G/A) is less than 1.1, the unreacted acid components may remain in the polymerization reaction, and accordingly, which deteriorates the transparency of the resin. When the mole ratio (G/A) is more than 1.8, the polymerization process is carried out too slowly, and accordingly, the productivity of the resin may decrease.

The esterification or ester exchange reaction can be carried out in the presence of a conventional titanium based catalyst, such as, tetraethyl titanate, acethyltripropyl titanate, tetrapropyl titanate, tetrabutyl titanate, polybutyl titanate, ethylacetoaceticester titanate, isostearyl titanate, titanium dioxide, $TiO_2/SiO_2$ co-precipitate, $TiO_2/ZrO_2$ coprecipitate, and so on. As the catalyst, it is not preferable to use a heavy metal (for example, antimony, tin) based catalyst, in considering the environmental aspect. The esterification or ester exchange reaction may be carried out, for example, under the nitrogen flow atmosphere at the temperature of 230 to 260° C., while removing water or alcohol produced from the reactants by a conventional method.

After the esterification or ester exchange reaction, the polycondensation reaction is carried out for the reaction product of the esterification or ester exchange reaction. The polycondensation reaction can also be carried out by conventional conditions. For example, at the temperature of 240 to 260° C., preferably at the temperature of less than 250° C., (a) the first (initial) polycondensation reaction is carried out under a high-vacuum and high speed stirring condition, then (b) the reaction pressure is adjusted to an atmospheric pressure by charging the reactor with nitrogen, and the reaction is further carried out under the high speed stirring condition, and (c) finally, while maintaining the atmospheric pressure, the reaction is further carried out under the low speed stirring condition to produce a polyester resin. In the polycondensation reaction, the byproducts such as glycol can be removed by distillation. In the initial polycondensation reaction, the high-vacuum condition can be equal to or less than 100 mmHg, preferably equal to or less than 30 mmHg. Due to the high vacuum condition, the byproduct having a low boiling point can be effectively removed from the polycondensation reaction system.

The glass transition temperature (Tg) of the polyester resin according to the present invention is preferably equal to or more than 58° C. When the Tg is less than 58° C., the pulverizing property and the storage stability of the produced toner may be deteriorated. The preferable softening temperature of the polyester resin is 150 to 210° C., and more preferably 160 to 180° C. When the softening temperature is less than 150° C., the Tg decreases and accordingly, the storage stability of the toner is deteriorated, so that toner particles may be cohered or aggregated during storage and the offset may be occurred at high temperature. When the softening temperature is more than 210° C., the low temperature fixing property of the toner is deteriorated, and the offset may be occurred. Also, the acid value of the polyester resin is preferably equal to or less than 30 KOHmg/g, and more preferably, 1 to 30 KOHmg/g, and most preferably, 1 to 20 KOHmg/g. When the acid value is more than 30 KOHmg/g, the storage stability of the polyester resin may be deteriorated during storage and/or delivery of the resin or in a developer of a printer.

The polyester resin of the present invention can be used as a main component of a binder resin for a toner. If necessary, the polyester resin of the present invention can be used in combination with other conventional resins such as styrene resin or styrene-acryl resin. The amount of the binder resin in the toner is preferably 30 to 95 weight %, and more preferably 35 to 90 weight %. When the amount of the binder resin is less than 30 weight %, the offset preventing property of the toner may be deteriorated, and when the amount of the binder resin is more than 95 weight %, the electrification stability of the toner may be deteriorated. The polyester resin of the present invention may be used with a coloring agent for a toner. Examples of the coloring agent or a pigment include carbon black, nigrosine dyes, lamp black, sudan black SM, naval yellow, mineral fast yellow, ritol red, permanent orange 4R, and so on. Also, the polyester resin of the present invention may be used with conventional additives for toner, such as wax, electrification control agent, magnetic substances (for example, magnetic powder), and so on. Examples of the wax include polyethylene wax, polypropylene wax, ethylene-polypropylene copolymer wax, and so on. Examples of the electrification control agent include nigrosine, azine-based dye containing alkyl group, basic dye, monoazo dye and its metal complex, salicylic acid and its metal complex, alkyl salicylic acid and its metal complex, naphthoic acid and its metal complex, and so on. Examples of the magnetic powder include ferrite, magnetite, and so on.

The toner including the polyester resin of the present invention may be prepared by conventional methods. For example, first, the polyester resin (a binder resin), a coloring agent, and other additives are mixed and kneaded with a uniaxial or biaxial extruder or a mixer at the temperature which is higher than the softening temperature of the binder resin by 15 to 30° C., and the kneaded mixture is pulverized to produce toner particles. The average particle size of the toner is generally 5 to 20 μm, and preferably 7 to 9 μm. Also, It is more preferable that the amount of the minute toner particles having the particle size of less than 5 μm is less than 3 weight % in the total toner.

The following examples and comparative examples are provided to illustrate the present invention in more detail, but the present invention is not restricted or limited by the following examples. In the following examples and comparative examples, the physical properties were measured as follows.

(1) Glass Transition Temperature, Tg (° C.): The glass transition temperature was measured with a differential scanning calorimeter (manufactured by TA Instruments) while quenching the melted sample and then increasing the sample temperature with the rate of 10° C./minute. The Tg was determined from the mid value of tangent lines of an endothermic curve and a base line.

(2) Acid Value (KOHmg/g): Resin was dissolved with dichloromethane, cooled, and titrated with 0.1N KOH-methanol solution.

(3) Softening Temperature (° C.): Softening temperature was determined with a flow tester (CFT-500D, manufactured by Shimadzu Laboratories), and is a temperature at the moment that the half of 1.5 g sample flows out from a 1.0Φ× 10 mm (height) nozzle under the conditions of 10 kgf of load, and temperature increase rate of 6° C./minute.

(4) S/M and Tan σ: Storage modulus (S/M), loss modulus (L/M), and loss tangent (tan σ, tan σ=Loss modulus/Storage modulus) were measured with Physica Rheometer (manufactured by Physica Co., Ltd. U.S.A.). During the measurements, a shear force was applied with a 25 mm parallel plate type instrument with shear rate (1/s) of 1 and strain of 5%, and a resin and a toner were cooled from 200° C. to 50° C. with the cooling speed of −5° C./min. In Tables 1 and 2, S/M and tan σ of a resin and a toner measured at low temperature (130° C.) and at high temperature (175° C.) are set forth, and the unit thereof are Pa.

(5) Pulverizing Property: During the preparation of a toner, the toner flake which was melt extruded was pulverized and classified with Hosokawa Zet mill pulverizer (100AFG, 50ATP, 50ZPS). The amount of the produced toner in one hour was evaluated as follows.
◎: more than 0.4 kg/hr
O: 0.2 to 0.4 kg/hr
X: 0 to 0.2 kg/hr (6) Storage Stability: 100 g of toner was put into a glass bottle and the bottle was sealed. After 48 hours at 50° C., the cohesion of the toner was observed by naked eyes. The cohesion degrees were evaluated as follows.
◎: No cohesion and good storage stability
O: Minute cohesion but good storage stability
X: Serious cohesion and bad storage stability (7) Minimum Fixing Temperature and Offset Temperature: After coating a white paper with the produced toner, the paper was passed through a heat roller coated with silicon oil with a speed of 200 mm/second. The lowest temperature at which more than 90% of toner was fixed was defined as the minimum fixing temperature. The highest temperature at which more than 90% of toner was fixed was defined as the offset temperature. The minimum fixing temperature and the offset temperature were measured within the temperature range of 50 to 230° C. of the heat roller. The temperature range between the minimum fixing temperature and the offset temperature was defined as the fixing temperature range.

(8) Image Density of Toner 5000 images were printed on OHP films or papers with a black-and-white printer, which had a heat roller coated with Teflon and a temperature controller, and had a printing speed of 40 pages/minute. Then, the image flows and image density (solid area) at the 100 th, 2,000 th, and 5,000 th printed image were measured with a Macbeth reflective densitometer RD918, and then evaluated as follows.

⊚: The image density is equal to or more than 1.4.
○: The image density is equal to or more than 1.2.
X: The image density is less than 1.2.

The abbreviations used in Examples and Comparative examples are as follows.

TPA: Terephthalic acid
IPA: Isophthalic acid
DMCD: Dimethyl 1,4-cyclohexane dicarboxylate or 1,4-cyclohexane dicarboxylic acid
CHDM: 1,4-cyclohexane dimethanol
TMA: Trimellitic acid
EG: Ethylene glycol
NPG: Neopentyl glycol
PG: 1,2-propylene glycol
BPA-EO: Polyoxyethylene-(2.3)-2,2-bis(4-hydroxyphenyl)propane
BPA-PO: Polyoxypropylene-(2.3)-2,2-bis(4-hydroxyphenyl)propane
TMP: Trimethylolpropane
GLY: Glycerol
Catalyst: Titanium dioxide and silicon dioxide co-precipitate
Stabilizer: Trimethyl phosphate

EXAMPLES 1-5 AND COMPARATIVE EXAMPLES 1-14

A. Preparation of Polyester Resin

Reactants, of which the kind and the amount are shown in Table 1, were introduced into a 2 L reactor equipped with a stirring apparatus and a flow-out condenser, wherein the ratio (G/A) of the total alcohol components (G) with respect to the total acid components (A) was controlled to 1.2 to 1.5, and $TiO_2/SiO_2$ co-precipitate was added as a catalyst in the amount of 200 ppm with respect to the acid components. While slowly increasing the temperature of the reactor to 250° C. under nitrogen-flow atmosphere and flowing out water (byproduct) from the reactor, the esterification reaction was carried out. After completion of the generation and the flowing-out of water, the reactants were transferred to a polycondensation reactor equipped with a stirring apparatus, a cooling condenser, and a vacuum system. Then, 200 ppm of the heat-stabilizer (trimethyl phosphate) was added. While increasing the temperature of the reactor to 250° C. and decreasing the pressure of the reactor to 50 mmHg during 30 minutes, the reaction was carried out at low vacuum state and excess diol was removed. Next, the pressure of the reactor was slowly decreased to 0.1 mmHg of high vacuum state, and the reaction was further carried out until a predetermined stirring torque was obtained. Then, the vacuum was removed, and TMA was added atmospheric pressure, and the reaction was completed after obtaining a desired acid value. Softening temperature, Tg, and Acid value of the produced polyester resin were measured and set forth in Table 1.

B. Preparation of Toner 50 weight part of the produced polyester resin, 45 weight part of magnetite as a magnetic material and a coloring agent, 2 weight part of azo-dye metal complex as an electrification control agent, and 3 weight part of polyethylene wax were mixed with a mixer, and melt-kneaded in an extruder. Next, the extruded mixture was finely pulverized with a Jet mill pulverizer, and the pulverized particles were classified with a wind-force classifier. Then, the particles were coated with 1 weight part of silica and 0.2 weight part of titanium dioxide to obtain toner particles having the volume average particle size of 8 to 9 μm. The pulverizing property, storage stability, minimum fixing temperature, offset temperature, and toner image density (at the 100 th, 2,000 th, and 5,000 th copies) of the produced toner were measured and set forth in Table 1.

TABLE 1

|  | Examples | | | | | Comparative Examples | | |
|---|---|---|---|---|---|---|---|---|
|  | 1 | 2 | 3 | 4 | 5 | 1 | 2 | 3 |
| TPA (mole part) | 89 | 94 | 70 | 74 | 89 | 50 | 50 | 47.5 |
| IPA (mole part) | — | — | — | 15 | — | 49 | 49 | 47.5 |
| DMCD (mole part) | 10 | 5 | 20 | 10 | 10 | — | — | — |
| TMA (mole part) | 1 | 1 | 10 | 1 | 1 | 1 | 1 | 5 |
| EG (mole part) | 30 | 30 | 43 | 40 | — | 40 | 40 | 50 |
| NPG (mole part) | 30 | — | — | 40 | — | — | — | 45 |
| PG (mole part) | — | 30 | 25 | — | 30 | — | — | — |
| BPA-EO (mole part) | — | — | — | — | — | 20 | 20 | — |
| BPA-PO (mole part) | — | — | — | — | — | 30 | 30 | — |
| CHDM (mole part) | 30 | 30 | 30 | 10 | 50 | — | — | — |
| TMP (mole part) | — | 10 | — | — | — | 10 | 10 | 5 |
| GLY (mole part) | 10 | — | 2 | 10 | 20 | — | — | — |
| Heat stabilizer (ppm) | 200 | 20 | 200 | 200 | 1000 | 200 | 0 | 0 |
| G/A | 1.2 | 1.4 | 1.2 | 1.2 | 1.3 | 1.4 | 1.4 | 1.2 |
| Polymerization time (minute) | 80 | 70 | 50 | 80 | 90 | 90 | 110 | 40 |
| Polymerization product | Normal | Normal | Normal | Normal | Normal | Normal | Normal | Normal |
| Tg (° C.) | 66 | 62 | 58 | 62 | 64 | 66 | 67 | 62 |

TABLE 1-continued

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Acid value (KOH mg/g) | 12 | 10 | 15 | 4 | 2 | 4 | 4 | 12 |
| Softening temperature of resin (° C.) | 184 | 157 | 194 | 177 | 175 | 174 | 196 | 198 |
| Softening temperature of toner (° C.) | 182 | 157 | 190 | 178 | 172 | 161 | 163 | 163 |
| S/M of resin (175° C.) | 2.0E3 | 6.0E2 | 3.5E3 | 1.8E3 | 1.0E3 | 1.7E3 | 2.4E3 | 2.3E3 |
| S/M of toner (175° C.) | 5.5E3 | 2.0E3 | 1.0E4 | 4.0E3 | 3.0E3 | 1.5E3 | 1.9E3 | 1.6E3 |
| Difference of S/M (175° C.) | 3.5E3 | 1.4E4 | 6.5E3 | 2.2E3 | 2.0E3 | −2.3E2 | −5.0E2 | −7.0E2 |
| Tan σ of resin (175° C.) | 3.60 | 7.80 | 1.62 | 3.50 | 3.30 | 1.62 | 1.42 | 1.58 |
| Tan σ of toner (175° C.) | 1.80 | 3.60 | 1.15 | 2.20 | 1.90 | 2.12 | 2.17 | 2.16 |
| Difference of tan σ (175° C.) | −1.80 | −4.20 | −0.47 | −1.30 | −1.40 | 0.50 | 0.75 | 0.58 |
| S/M of resin (130° C.) | 3.5E4 | 9.0E3 | 4.5E4 | 3.3E4 | 1.8E4 | 1.0E4 | 1.6E4 | 1.0E4 |
| S/M of toner (130° C.) | 3.8E4 | 9.2E3 | 5.0E4 | 3.5E4 | 2.5E4 | 2.4E4 | 2.6E4 | 2.4E4 |
| Difference of S/M (130° C.) | 3.0E3 | 2.0E2 | 5.0E3 | 2.0E3 | 7.0E3 | 1.4E4 | 1.0E4 | 1.4E4 |
| Tan σ of resin (130° C.) | 1.92 | 2.50 | 1.12 | 1.35 | 1.45 | 1.71 | 1.40 | 1.59 |
| Tan σ of toner (130° C.) | 1.75 | 2.51 | 0.93 | 1.20 | 1.32 | 1.41 | 1.18 | 1.35 |
| Difference of tan σ (130° C.) | −0.17 | 0.01 | −0.19 | −0.15 | −0.13 | −0.30 | −0.22 | −0.24 |
| Pulverizing property | ◎ | ◎ | ○ | ◎ | ◎ | ◎ | ◎ | ◎ |
| Storage stability | ◎ | ◎ | ○ | ◎ | ◎ | ◎ | ◎ | ○ |
| Minimum fixing temperature (° C.) | 140 | 130 | 150 | 130 | 130 | 150 | 150 | 140 |
| Offset temperature (° C.) | 220 | 180 | 230 | 200 | 210 | 180 | 190 | 180 |
| Fixing temperature range (° C.) | 80 | 50 | 80 | 70 | 80 | 30 | 40 | 40 |
| Image density (at 100 copies) | ◎ | ◎ | ◎ | ◎ | ◎ | ◎ | ◎ | ○ |
| Image density (at 2000 copies) | ◎ | ◎ | ◎ | ◎ | ◎ | ◎ | ◎ | ○ |
| Image density (at 5000 copies) | ◎ | ◎ | ○ | ◎ | ◎ | ◎ | ◎ | X |

TABLE 2

|  | Comparative Examples | | | | | | | | | | |
| --- | --- | --- | --- | --- | --- | --- | --- | --- | --- | --- | --- |
|  | 4 | 5 | 6 | 7 | 8 | 9 | 10 | 11 | 12 | 13 | 14 |
| TPA (mole part) | 74 | 74 | 74 | 89 | 69 | 49 | 50 | 89 | 89 | 74 | 73 |
| IPA (mole part) | 25 | 25 | 25 | — | — | — | 50 | — | — | 25 | — |
| DMCD (mole part) | — | — | — | 10 | 30 | 50 | — | 10 | 10 | — | 25 |
| TMA (mole part) | 1 | 1 | 1 | 1 | 1 | 1 | — | 1 | 1 | 1 | 2 |
| EG (mole part) | 45 | 45 | 45 | 45 | 45 | 45 | 15 | 45 | 60 | 15 | 45 |
| NPG (mole part) | 20 | 20 | — | 25 | 25 | 25 | 60 | — | — | — | 25 |
| PG (mole part) | 20 | — | — | 25 | 25 | 25 | — | — | — | — | — |
| CHDM (mole part) | 10 | 30 | 50 | — | — | — | 25 | 30 | 30 | 80 | 25 |
| TMP (mole part) | 5 | 5 | 5 | 5 | 5 | 5 | 1 | 25 | 10 | 5 | 5 |
| Heat stabilizer (ppm) | 100 | 300 | 200 | 200 | 200 | 300 | 200 | 200 | 1500 | 200 | 200 |
| G/A | 1.8 | 1.4 | 1.2 | 1.2 | 1.2 | 1.2 | 1.5 | 1.2 | 1.5 | 1.2 | 1.2 |
| Polymerization time (minute) | 110 | 90 | 120 | 80 | 70 | 90 | 120 | 20 | 280 | 240 | 80 |
| Polymerization product | Normal | Normal | Normal | Normal | Normal | Normal | Normal | Gelation | Normal | Normal | Normal |

TABLE 2-continued

|  | Comparative Examples | | | | | | | | | | |
|---|---|---|---|---|---|---|---|---|---|---|---|
|  | 4 | 5 | 6 | 7 | 8 | 9 | 10 | 11 | 12 | 13 | 14 |
| Tg (° C.) | 71 | 72 | 73 | 63 | 53 | 43 | 65 | 66 | 50 | 59 | 57 |
| Acid value (KOH mg/g) | 12 | 9 | 11 | 4 | 8 | 9 | <1 | — | 5 | 15 | 35 |
| Softening temperature of resin (° C.) | 171 | 173 | 195 | 176 | 194 | 160 | 189 | 234 | 132 | 140 | 172 |
| Softening temperature of toner (° C.) | 170 | 172 | 197 | 171 | 190 | 156 | — | — | 131 | 142 | 176 |
| S/M of resin (175° C.) | 7.1E2 | 1.6E3 | 3.7E3 | 2.2E3 | 7.0E3 | 7.5E2 | 1.4E3 | — | 4.3E0 | 9.8E0 | 2.4E3 |
| S/M of toner (175° C.) | 2.9E3 | 3.8E3 | 1.3E4 | 2.6E3 | 7.2E3 | 9.1E2 | — | — | 9.8E0 | 1.2E1 | 3.8E3 |
| Difference of S/M (175° C.) | 2.2E3 | 2.2E3 | 8.8E3 | 4.0E2 | 1.8E3 | 1.6E2 | — | — | 5.5E0 | 2.3E0 | 1.4E3 |
| Tan σ of resin (175° C.) | 5.67 | 4.57 | 1.98 | 1.62 | 0.95 | 1.15 | 9.6 | — | 1000 | 202 | 2.96 |
| Tan σ of toner (175° C.) | 2.31 | 2.50 | 1.53 | 1.64 | 1.16 | 2.19 | — | — | 202 | 89 | 2.13 |
| Difference of tan σ (175° C.) | −3.36 | −2.07 | −0.45 | 0.02 | 0.21 | 1.04 | — | — | −798 | −112 | −0.83 |
| S/M of resin (130° C.) | 2.3E4 | 4.4E4 | 4.9E4 | 3.3E4 | 2.6E4 | 5.7E3 | 9.7E4 | — | 4.4E2 | 2.0E3 | 2.8E4 |
| S/M of toner (130° C.) | 5.1E4 | 6.6E4 | 1.4E5 | 4.1E4 | 3.0E4 | 7.8E3 | — | — | 8.8E2 | 2.5E3 | 3.8E4 |
| Difference of S/M (130° C.) | 2.8E4 | 2.2E4 | 9.1E4 | 8.0E3 | 4.0E3 | 2.1E3 | — | — | 4.4E2 | 5.0E2 | 1.0E4 |
| Tan σ of resin (130° C.) | 1.83 | 1.69 | 1.24 | 1.26 | 1.04 | 1.38 | 1.38 | — | 20 | 3.76 | 1.55 |
| Tan σ of toner (130° C.) | 1.44 | 1.39 | 0.90 | 1.17 | 1.07 | 1.71 | — | — | 15 | 3.20 | 1.35 |
| Difference of tan σ (130° C.) | −0.39 | −0.30 | −0.34 | −0.09 | 0.03 | 0.33 | — | — | −5 | −0.56 | −0.20 |
| Pulverizing property | ○ | ○ | ○ | ○ | X | X | X | — | ◎ | ○ | ○ |
| Storage stability | ◎ | ◎ | ◎ | ◎ | X | X | — | — | X | ◎ | X |
| Minimum fixing temperature (° C.) | 150 | 160 | 180 | 130 | 130 | 120 | — | — | — | 120 | 150 |
| Offset temperature (° C.) | 200 | 210 | 230 | 180 | 200 | 170 | — | — | — | 140 | 220 |
| Fixing temperature range (° C.) | 50 | 50 | 50 | 50 | 70 | 50 | — | — | — | 20 | 70 |
| Image density (at 100 copies) | ◎ | ◎ | ◎ | ◎ | ◎ | ◎ | — | — | X | ○ | ◎ |
| Image density (at 2000 copies) | ◎ | ◎ | ◎ | ◎ | ○ | X | — | — | X | X | ○ |
| Image density (at 5000 copies) | ◎ | ◎ | ◎ | ◎ | X | X | — | — | X | X | ○ |

As shown Table 1, in Examples 1 to 5 (1 to 10 mol % of trivalent or higher polycarboxylic acid and 3 to 20 mol % of DMCD with respect to the total acid components; 10 to 50 mol % of CHDM and 2 to 20 mol % of trihydric or higher alcohol with respect to the total alcohol components), desirable polymerization products were produced with desirable reactivity (polymerization times). The polyester resins of Examples 1 to 5 had high Tg, and accordingly, good storage stabilities. In addition, the polyester resins of Examples 1 to 5 had good pulverizing property due to the increased molecular weight range which is results from trivalent or higher polycarboxylic acid or polyhydric alcohol. Also, the softening temperature differences between the resins and the toners were less than 10° C. Since the decrease of the softening temperature in preparing a toner was minute, the offset temperature was formed at high temperature range. Particularly, when preparing a toner at high temperature of 175° C., the storage modulus (S/M) of the toner increases compared with that of the resin, and the difference of loss tangent (tan σ) of the toner and the resin decreases to less than −0.4. In the polyester resins of Examples, aliphatic diol (CHDM) and 5 to 1000 ppm of the heat stabilizer are introduced, which improves anti-hydrolysis property and a heat stability of the resin. Thus, when preparing a toner in a kneader with strong shear force and much heat, the decrease of the molecular weight of the polyester resin can be prevented. Also, the inorganic additive in the resin increases elastic property of the toner. Due to these features, the offset temperature of the toner was formed at high temperature range. Also, when preparing a toner at low temperature of 130° C., the storage modulus (S/M) of the toner relatively slightly increases compared with that of the resin, and the difference of loss tangent (tan σ) of the toner and the resin is relatively not small, more specifically, more than −0.2. Therefore, at low temperature, the elasticity increase of the toner due to the addition of inorganic additives was suppressed, and accordingly, the toner had a desirable low temperature fixing property. These might result from the introduction of alicyclic dibasic acid (DMCD) as a soft segment instead of TPA, IPA, and TMA as a hard segment as the acid component of the polyester resin.

In addition, DMCD and CHDM having lipophilic property improve the anti-moisture property of a toner, and accordingly, the toner had good image density at long-term use or storage. In addition, when preparing a toner with the resin having softening temperature of 150 to 210° C., Tg of more than 58° C., and acid value of 2 to 30 KOHmg/g, the toner had a good storage stability, a desirable fixing temperature range, and a desirable image density.

Generally, a toner should have high viscosity and low elasticity at low temperature in order to have a good fixing property at low temperature. And a toner should have low viscosity and high elasticity at high temperature in order to have a good offset property at high temperature. When a toner is prepared with a resin, the loss modulus (L/M) uniformly increases both at high temperature and at low temperature. However, the storage modulus (S/M) changes differently at high temperature and at low temperature according to properties of the resin. The polyester resin of the present invention includes CHDM and DMCD. Thus, at low temperature, the increase of storage modulus (S/M) of the toner, namely the decrease of tan σ is small, and accordingly, the desirable low temperature fixing property can be obtained. On the contrary, at high temperature, the increase of storage modulus (S/M) of the toner, namely the decrease of tan σ is large, and accordingly, the desirable high temperature offset property can be obtained.

As shown in Comparative examples 1 and 2, when aromatic diol (bisphenol-A derivatives) was used, a good pulverizing property, a good storage stability, and a good image density can be obtained. As shown in Comparative example 3, when only linear aliphatic diol (EG, NPG, TMP) was used without introducing DMCD, CHDM, and bisphenol-A or derivatives thereof having lipophilic property, a good pulverizing property of a toner can be obtained, but the resin includes relatively large amount of ester group, and accordingly, the toner absorbs much moisture at high temperature and humidity condition, and it is difficult to maintain a good image density at long-term use. In the toner of Comparatives examples 1 to 3, the difference of the softening temperature between the resin and the toner was more than 10° C. Namely, when preparing a toner, the softening temperature decreases, and accordingly, the offset temperature was not formed at high temperature range. Particularly, as shown in Examples 2 and 3, when the heat stabilizer was not used, the softening temperature decreases more greatly due to the heat-decomposition during the preparation of a toner. In addition, when preparing a toner at high temperature of 175° C., the storage modulus (S/M) of the toner decreases compared with that of the resin, and the difference of loss tangent (tan σ) of the toner and the resin is more than −0.5. Thus, when preparing a toner in a kneader with strong shear force and much heat, the molecular weight of the polyester resin decreases and the offset temperature of the toner decreases. Also, when preparing a toner at low temperature of 130° C., the storage modulus (S/M) of the toner increases more greatly compared with that of resin, and the difference of loss tangent (tan σ) of the toner and the resin decreases to less than −0.2. Accordingly, at low temperature, the elasticity of the toner increases more greatly by mixing the resin and the inorganic additive, which results in the deterioration of the low temperature fixing property.

As shown in Comparative examples 4 to 6, when CHDM was introduced, but DMCD was not introduced, the toner had good storage stability and a good image density. The softening temperature difference between the resin and the toner was less than 10° C. When preparing a toner, since the decrease of the softening temperature is small, the offset temperature was formed at high temperature range. Particularly, when preparing a toner at high temperature of 175° C., the storage modulus (S/M) of the toner increased compared with that of the resin, and the difference of loss tangent (tan σ) between the toner and the resin decreased to less than −0.5. However, when preparing a toner at low temperature of 130° C., the storage modulus (S/M) of the toner increased more greatly compared with that of the resin, and the difference of loss tangent (tan σ) between the toner and the resin decreased to less than −0.2. Accordingly, at low temperature, the elasticity of the toner increases more greatly by mixing the resin and the inorganic additive, which results in the deterioration of the low temperature fixing property.

As shown in Comparative examples 7 to 9, when DMCD was introduced, but CHDM was not introduced, the desirable image density can be obtained at the initial stage of use. However, the resin had a low Tg, and the pulverizing property, the storage stability, and the image density at long-term use were deteriorated. Also, the softening temperature difference between the resin and the toner was 4 to 5° C. Due to the decrease of the softening temperature when preparing the toner, the offset temperature was not formed at high temperature range. Particularly, when preparing the toner at high temperature of 175° C., the increase of the storage modulus (S/M) of the toner compared with that of the resin was not enough, and the difference of loss tangent (tan σ) of the toner and the resin increased to more than −0.5. Therefore, the high temperature offset property was not desirable, but, when preparing a toner at low temperature of 130° C., the storage modulus (S/M) of the toner increased in relatively less amount compared with that of the resin, and the difference of loss tangent (tan σ) of the toner and the resin decreased to more than −0.2. Accordingly, at low temperature, the elasticity of the toner increases in relatively less amount by mixing the resin and the inorganic additive, which results in the improvement of the low temperature fixing property.

As shown in Comparative example 10, when the amount of polyhydric alcohol was too small, a toner had a bad pulverizing property, and the toner could not be properly prepared. As shown in Comparative example 11, when the amount of tirhydric or higher alcohol was more than 20 mol %, the resin was gelated, and the resin can not be properly pulverized, and thus the toner could not be properly prepared. As shown in Comparative examples 12 to 13, when the amount of the heat stabilizer was too much or the amount of CHDM was too much, it took much time for the polymerization reaction, and a resin having a desired polymerization degree can not obtained, which results in the bad image density and the bad fixing temperature range due to an offset. As shown in Comparative example 14, when the amount of DMCD was too much, Tg of the resin decreased, and the pulverizing property and the storage stability of the toner were deteriorated. Also, due to the high acid value, the image density was also deteriorated.

INDUSTRIAL APPLICABILITY

The toner of the present invention can be economically produced, and has desirable storage stability, wide fixing temperature range, and desirable image density.

The invention claimed is:
1. A polyester resin comprising:
  acid components including 70 to 96 mol % of aromatic dibasic acid component, 3 to 20 mol % of cycloaliphatic dibasic acid component, and 1 to 10 mol % of trivalent or higher acid component;

alcohol components including 10 to 50 mol % of cycloaliphatic diol component, 2 to 20 mol % of trihydric or higher alcohol component, and 30 to 88 mol % of aliphatic diol component; and a heat stabilizer wherein a softening temperature of the polyester resin is 150 to 210° C., an acid value of the polyester resin is 1 to 30 KOHmg/g, and a glass transition temperature of the polyester resin is more than 58° C.

2. The polyester resin according to claim 1, wherein the amount of the heat stabilizer is 5 to 1000 ppm with respect to the total weight of the polyester resin.

3. The polyester resin according to claim 1, wherein the acid components further include aliphatic dibasic acid component of 0.1 to 10 mol % with respect to the total acid components.

4. The polyester resin according to claim 1, wherein the heat stabilizer is selected from the group consisting of phosphoric acid, trimethyl phosphate, triethyl phosphate, and mixtures thereof.

5. A toner comprising the polyester resin of claim 1.

6. A method for preparing a polyester resin comprising the steps of:
(a) carrying out an esterification or ester exchange reaction with acid components including 70 to 96 mol % of aromatic dibasic acid component, 3 to 20 mol % of cycloaliphatic dibasic acid component, and 1 to 10 mol % of trivalent or higher acid component; and alcohol components including 10 to 50 mol % of cycloaliphatic diol component, 2 to 20 mol % of trihydric or higher alcohol component, and 30 to 88 mol % of aliphatic diol component in presence of titanium based catalyst; and
(b) carrying out a polycondensation reaction for reaction product of the esterification or ester exchange reaction,
wherein the esterification or ester exchange reaction and/or the polycondensation reaction is carried out in the presence of a heat stabilizer
wherein a softening temperature of the polyester resin is 150 to 210° C., an acid value of the polyester resin is 1 to 30 KOHmg/g, and a glass transition temperature of the polyester resin is more than 58° C.

* * * * *